United States Patent
Wu (10) Patent No.: US 9,789,929 B2
(45) Date of Patent: Oct. 17, 2017

(54) COMPOUND POWER MECHANISM AND ELECTRIC BICYCLE

(71) Applicant: Shyang-Jun Wu, Taipei (TW)

(72) Inventor: Shyang-Jun Wu, Taipei (TW)

(*) Notice: Subject to any disclaimer, the term of this patent is extended or adjusted under 35 U.S.C. 154(b) by 47 days.

(21) Appl. No.: 14/972,093

(22) Filed: Dec. 17, 2015

(65) Prior Publication Data

US 2016/0176474 A1 Jun. 23, 2016

(30) Foreign Application Priority Data

Dec. 19, 2014 (TW) .............................. 103222509 U
Oct. 27, 2015 (TW) .............................. 104217167 U (51) Int. Cl.
*B62M 6/55* (2010.01)
*B62M 6/70* (2010.01)
*B62M 23/00* (2006.01)
*H02K 7/116* (2006.01)
*H02K 7/14* (2006.01)

(52) U.S. Cl.
CPC ................ *B62M 6/55* (2013.01); *B62M 6/70* (2013.01); *B62M 23/00* (2013.01); *H02K 7/116* (2013.01); *H02K 7/14* (2013.01)

(58) Field of Classification Search
CPC .......... B62M 6/55; B62M 6/70; B62M 23/00; H02K 5/161
See application file for complete search history.

(56) References Cited

U.S. PATENT DOCUMENTS

| 3,921,741 | A | 11/1975 | Garfinkle et al. |
| 5,828,145 | A | 10/1998 | Nakamura |
| 6,196,347 | B1* | 3/2001 | Chao ........................ B62M 6/50 180/206.2 |
| 6,296,072 | B1* | 10/2001 | Turner ...................... B62M 6/55 180/206.2 |
| 7,628,518 | B2 | 12/2009 | Fujii et al. |
| 7,753,157 | B1* | 7/2010 | Woods ..................... B62K 11/06 180/205.5 |
| 8,256,554 | B2* | 9/2012 | Chan ........................ B62M 6/45 180/206.4 |
| 8,522,651 | B2* | 9/2013 | Xu .......................... B25B 13/463 81/60 |
| 8,794,368 | B2* | 8/2014 | Gu ........................... B62M 6/55 180/205.1 |

(Continued)

*Primary Examiner* — Jacob D Knutson
*Assistant Examiner* — Gabriela C Craciun
(74) *Attorney, Agent, or Firm* — PAI Patent & Trademark Law Firm; Chao-Chang David Pai (57) ABSTRACT

A compound power mechanism and an electric bicycle are provided. The compound power mechanism includes a motor casing fixed to the bicycle, a motor drive shaft coupled with a rotor, and a stator provided in the motor casing. A crank drive shaft is disposed in the motor drive shaft. Two ends of the crank drive shaft extend out of the two ends of the motor drive shaft and are coupled with pedal cranks. A freewheel is coupled to a respective end of the motor drive shaft and the crank drive shaft. A drive sprocket is located between and coupled to the two freewheels and adapted to bring a bicycle chain to turn. The drive sprocket can be driven by the motor drive shaft or by the crank drive shaft when pedaled. The size of the motor is reduced and the cost of manufacture is lowered.

10 Claims, 7 Drawing Sheets

(56) References Cited

U.S. PATENT DOCUMENTS

| | | | | |
|---|---|---|---|---|
| 9,017,201 | B2* | 4/2015 | Hino | B62M 11/04 |
| | | | | 475/5 |
| 9,120,533 | B2* | 9/2015 | Zanfei | B62M 6/50 |
| 9,359,034 | B2* | 6/2016 | Rasmussen | B62K 5/05 |
| 2013/0075176 | A1* | 3/2013 | Chan | B62M 6/55 |
| | | | | 180/206.4 |
| 2013/0233091 | A1* | 9/2013 | Tetsuka | B62M 3/003 |
| | | | | 73/862.621 |
| 2014/0345421 | A1* | 11/2014 | Gingl | B62M 6/55 |
| | | | | 74/661 |
| 2015/0214813 | A1* | 7/2015 | Timonen | B62M 6/55 |
| | | | | 310/67 R |
| 2015/0266542 | A1* | 9/2015 | Marioni | H02K 7/14 |
| | | | | 180/62 |
| 2015/0291256 | A1* | 10/2015 | Taitt | B62M 6/65 |
| | | | | 475/2 |
| 2016/0031525 | A1* | 2/2016 | Craven | B62J 99/00 |
| | | | | 180/206.2 |
| 2016/0107720 | A1* | 4/2016 | Xu | B62M 6/50 |
| | | | | 475/4 |
| 2016/0107721 | A1* | 4/2016 | Urabe | B62M 6/55 |
| | | | | 475/4 |
| 2016/0159431 | A1* | 6/2016 | Hayslett | B62M 6/50 |
| | | | | 180/206.3 |
| 2016/0159435 | A1* | 6/2016 | Yehuda | B62M 6/55 |
| | | | | 180/220 |
| 2016/0332696 | A1* | 11/2016 | Spaggiari | B62M 6/55 |
| 2016/0339993 | A1* | 11/2016 | Hayslett | B62M 6/55 |

* cited by examiner

FIG. 7

# COMPOUND POWER MECHANISM AND ELECTRIC BICYCLE

BACKGROUND OF THE INVENTION (a) Field of the Invention

The present invention relates to a compound power mechanism and an electric bicycle, and more particularly to a compound power mechanism able to integrate brushless motor power with pedal power.

(b) Description of the Prior Art

These days, an electric bicycle is provided with a brushless motor instead of a brushed motor. The brushless motor is small in size and has high efficiency, and provides a multi-pole (10 to 32 poles) and low speed. During the development of electric bicycles, a hub motor is derived, such as disclosed in U.S. Pat. No. 3,921,741, U.S. Pat. No. 7,628,518, and U.S. Pat. No. 5,828,145. The hub motor is directly mounted on the front wheel or the rear wheel of a bicycle, without transmission of a chain. However, the hub motor has the problems that the hub motor makes the bicycle off-balance and that water can easily flow into the hub motor. Thus, the motor should be disposed at the center of the bicycle frame to overcome the shortcomings of the hub motor. The problem of the brushless motor applications is how to couple with pedal cranks for the electric bicycle to provide both motor power and pedal power without making the structure too complicated. For example, speed change of a gear box is not required so to lower the manufacture cost and power loss. Accordingly, the inventor of the present invention has devoted himself based on his many years of practical experiences to solve these problems.

SUMMARY OF THE INVENTION

The primary object of the present invention is to provide a compound power mechanism and an electric bicycle, enabling motor power and pedal power to be integrated into a power mechanism. The bicycle can be driven by the motor power or the pedal power. The size is reduced and the cost of manufacture is lowered.

In order to achieve the object, the compound power mechanism comprises a motor casing. The motor casing has two shaft holes at two opposing sides thereof. A motor drive shaft is disposed between the shaft holes at the two sides of the motor casing. The motor drive shaft has a central inner shaft hole communicating with two ends thereof. A stator is coupled in the motor casing. A rotor is coupled to the motor drive shaft. A crank drive shaft is disposed in the inner shaft hole of the motor drive shaft. Two ends of the crank drive shaft extend out of the two ends of the motor drive shaft. A freewheel is coupled to one end of the motor drive shaft. Another freewheel is coupled to one end of the crank drive shaft. A drive sprocket is located between and coupled to the two freewheels. The freewheels respectively bring the drive sprocket to turn unidirectionally so as to turn a rear wheel of a bicycle.

In order to achieve the object, the electric bicycle comprises the motor casing. The motor casing is transversely coupled to a coupling portion of a bicycle frame. The coupling portion is disposed at the junction of a rear lower fork tube and a lower tube and seat pillar post of the bicycle frame. The two ends of the crank drive shaft are located at two sides of the bicycle. The bicycle frame or a luggage carrier is provided with a lithium battery unit of a 48-volt variable-frequency continuously variable transmission. The lithium battery unit of the variable-frequency continuously variable transmission is electrically connected with the coils of the stator. The drive sprocket is wound with a chain. The chain is wound on a one-section or multi-section derailleur at the rear of the bicycle.

The structure and effects of the compound power mechanism and the electric bicycle of the present invention are described hereinafter. The motor drive shaft is a hollow shaft. The crank drive shaft is inserted in the motor drive shaft to be integrated into a single shaft structure so as to reduce the size of the motor. The single shaft structure can be coupled with freewheels respectively. The freewheels are further coupled to the drive sprocket. The motor drive shaft and the crank drive shaft can turn the one-section or multi-section derailleur at the rear of the bicycle, respectively. They don't interfere with each other. Both the motor power and the pedal power can be applied, enhancing the route and the power of the electric bicycle. The freewheels and the drive sprocket are normal parts of the existing bicycle. There is no need to manufacture specially. The forging structures are just assembled, so the manufacturing cost of the motor is lowered accordingly. The motor is a low-speed multi-pole brushless motor, which is small in size and has high efficiency compared to the brushed motor.

DETAILED DESCRIPTION OF THE PREFERRED EMBODIMENTS

Embodiments of the present invention will now be described, by way of example only, with reference to the accompanying drawings.

Figure 1:
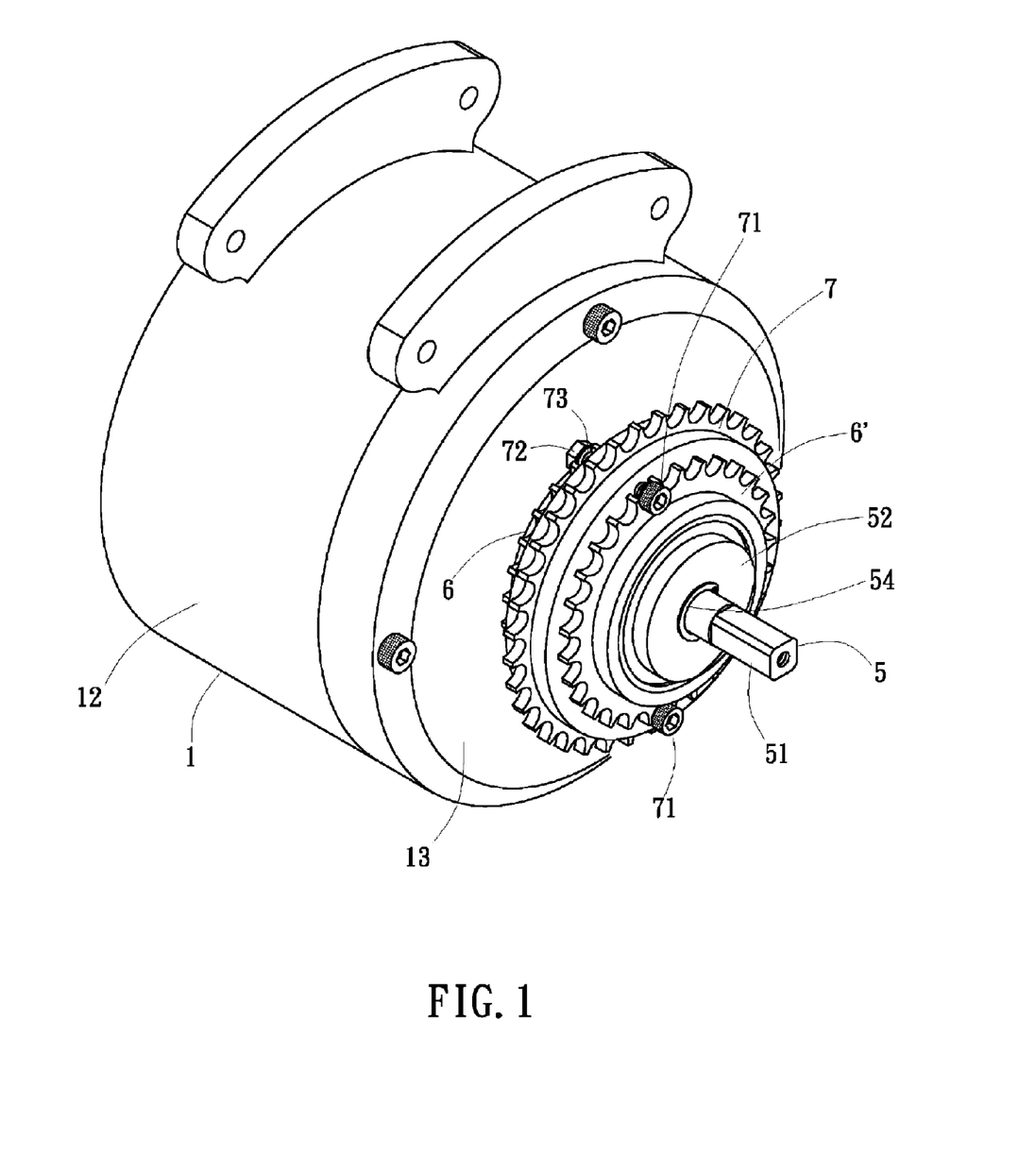
FIG. 1 is a perspective view of the compound motor mechanism according to a preferred embodiment of the present invention.
Figure 2:
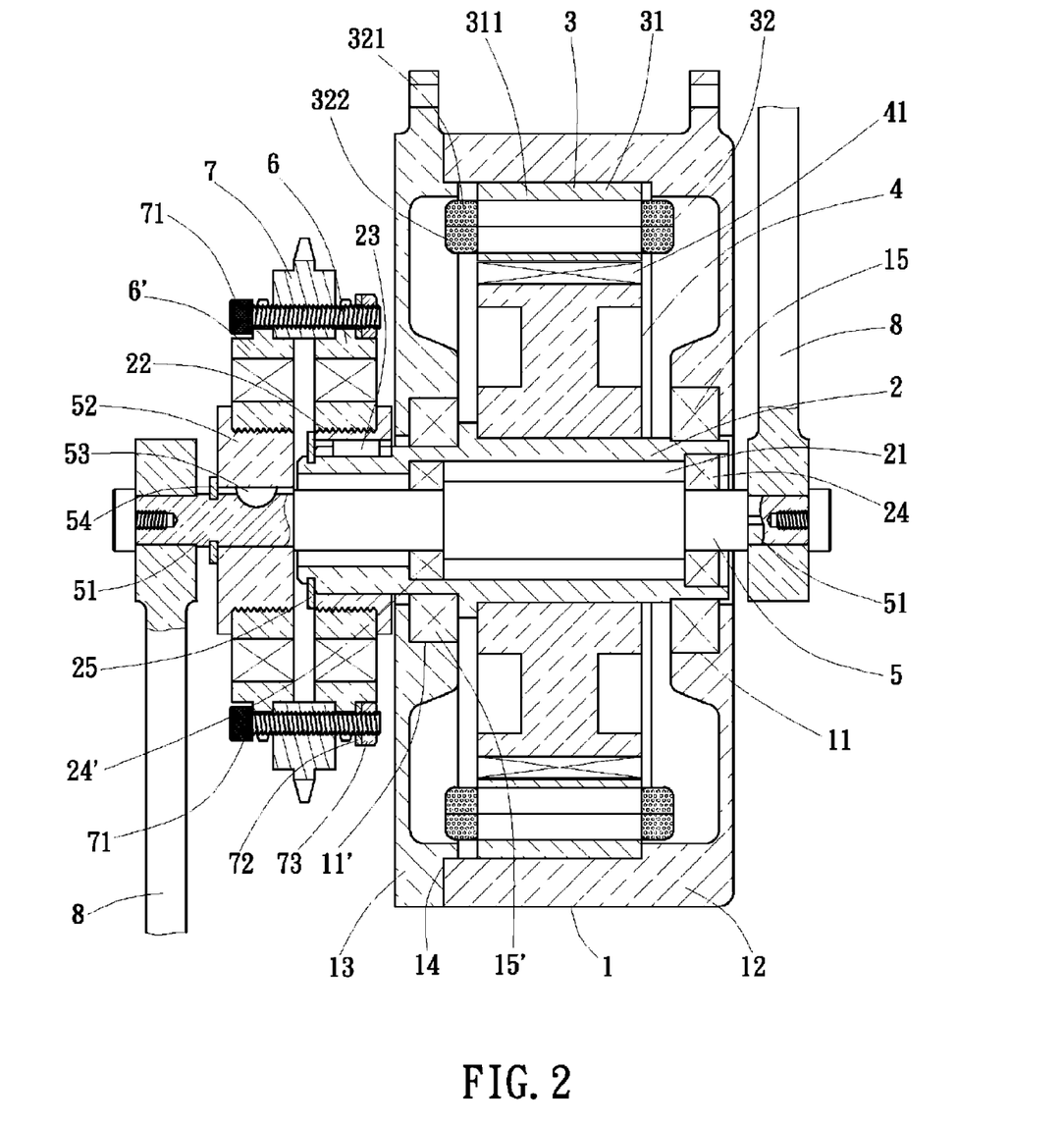
FIG. 2 is a sectional view of the compound motor mechanism according to the preferred embodiment of the present invention.

As shown in FIG. 1 and FIG. 2, the present invention discloses a compound power mechanism mounted to an electric bicycle, enabling the electric bicycle to provide both motor power and pedal power. In a preferred embodiment, the present invention comprises a motor casing 1, a motor drive shaft 2, a stator 3, a rotor 4, a crank drive shaft 5, two freewheels 6, 6', and a drive sprocket 7.

Figure 4:
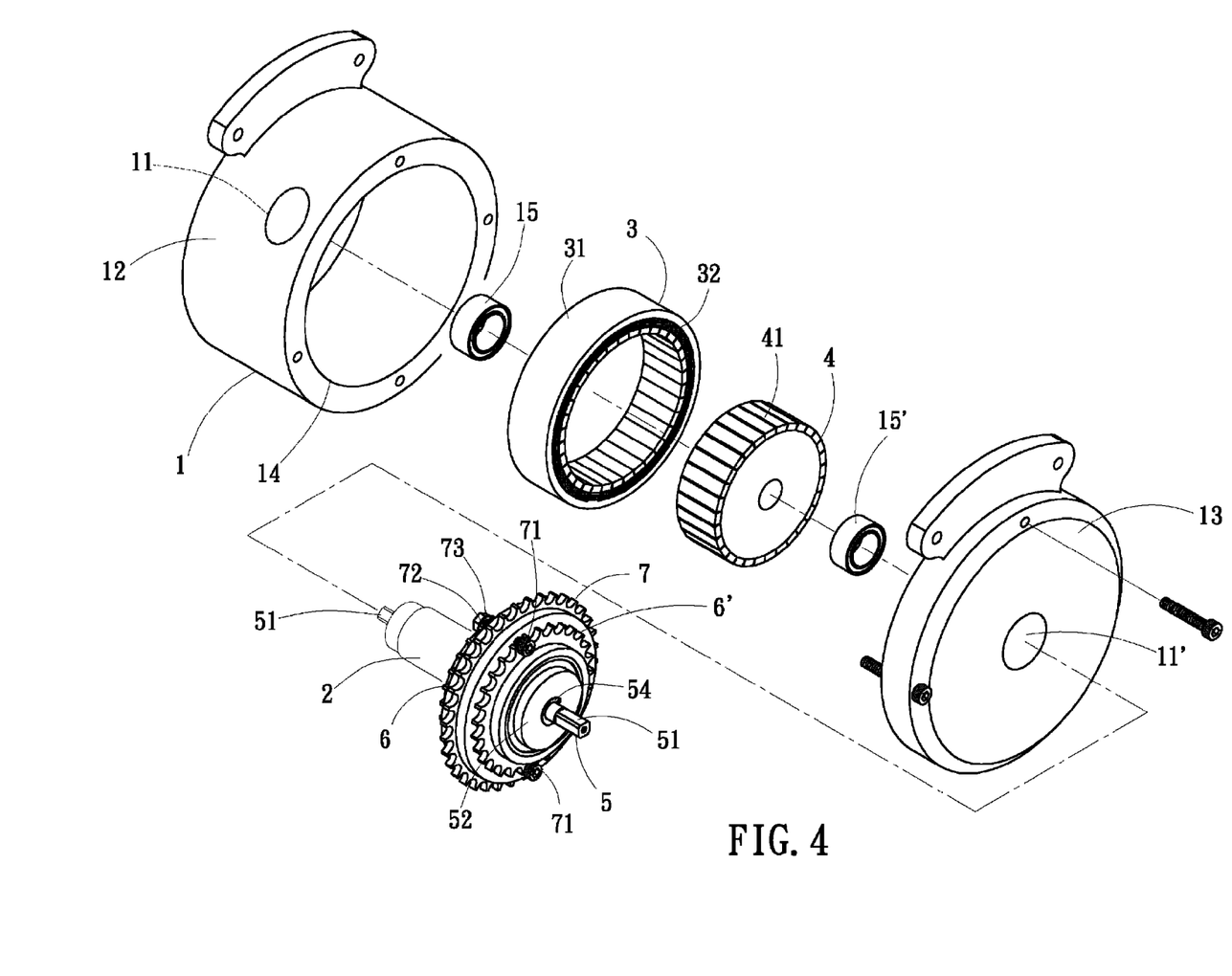
FIG. 4 is a second exploded view of the compound power mechanism according to the preferred embodiment of the present invention.
Figure 6:
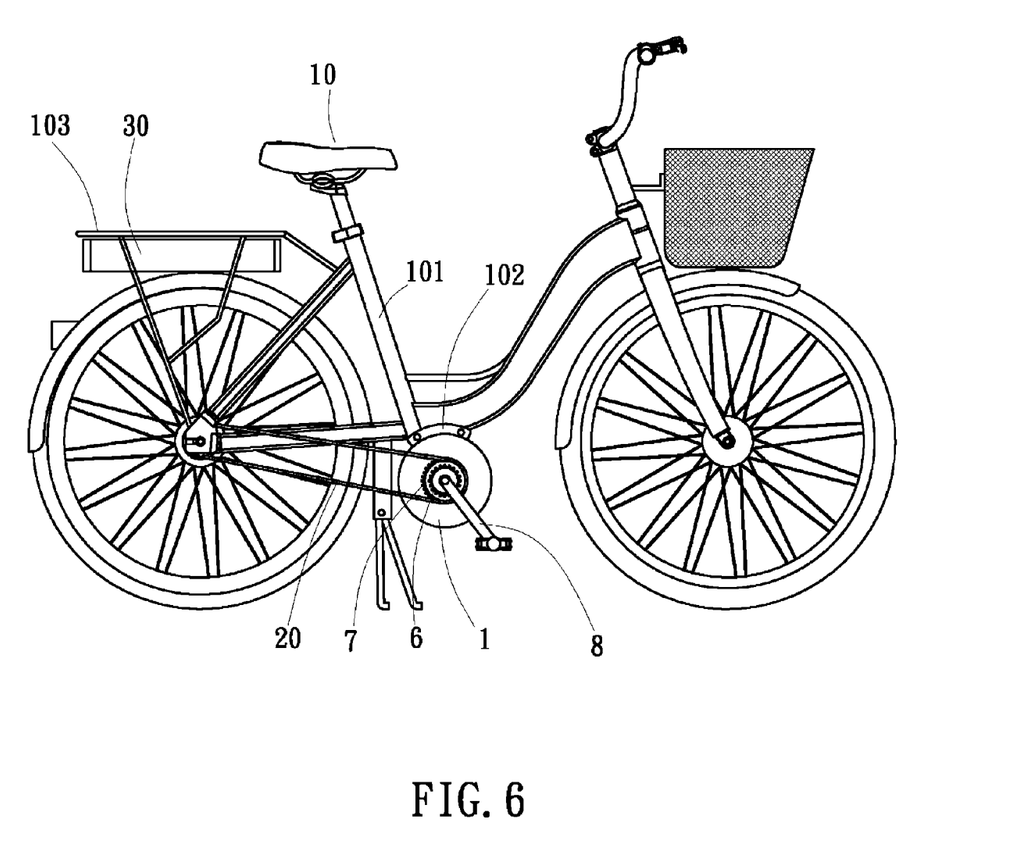
FIG. 6 is a first schematic view of the preferred embodiment of the compound power mechanism being used in an electric bicycle.
Figure 7:
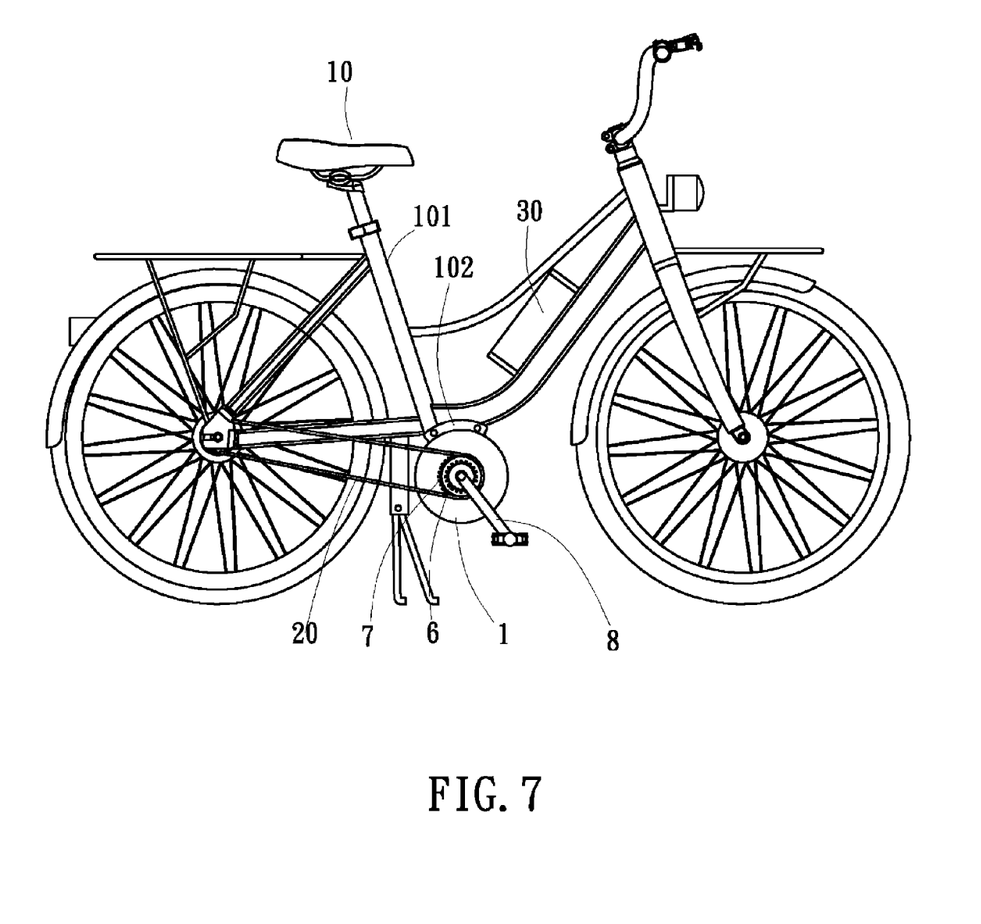
FIG. 7 is a second schematic view of the preferred embodiment of the compound power mechanism being used in an electric bicycle.

The motor casing 1 is fixed to a frame 101 (as shown in FIG. 6 or FIG. 7) of a bicycle 10. The motor casing 1 can be a closed hollow casing. Two sides of the motor casing 1 are provided with shaft holes 11, 11'; As shown in FIG. 2 and FIG. 4, the motor casing 1 comprises a main casing 12 and a side cover 13 coupled to the main casing 12. One side of the main casing 12 is provided with the shaft hole 11, and another side of the main casing 12 is provided with an opening 14; The side cover 13 is coupled to the opening 14 of the main casing 12. The side cover 13 is provided with the shaft hole 11'. The shaft holes 11, 11' are provided with first bearings 15, 15'. The first bearings 15, 15' are adapted to support the motor drive shaft 2 for rotation.

As shown in FIG. 4, the motor drive shaft 2 is a hollow turning shaft. The motor drive shaft 2 is rotatably disposed between the first bearings 15, 15' of the shaft holes 11, 11' at the two sides of the motor casing 1. Two ends of the motor drive shaft 2 pass through the first bearings 15, 15', respectively. One of the two ends of the motor drive shaft 2 slightly extends out of the motor casing 1. In particular, as shown in FIG. 3, the motor drive shaft 2 has a central inner shaft hole 21 communicating with two ends thereof to receive the crank drive shaft 5 therein.

Figure 5:
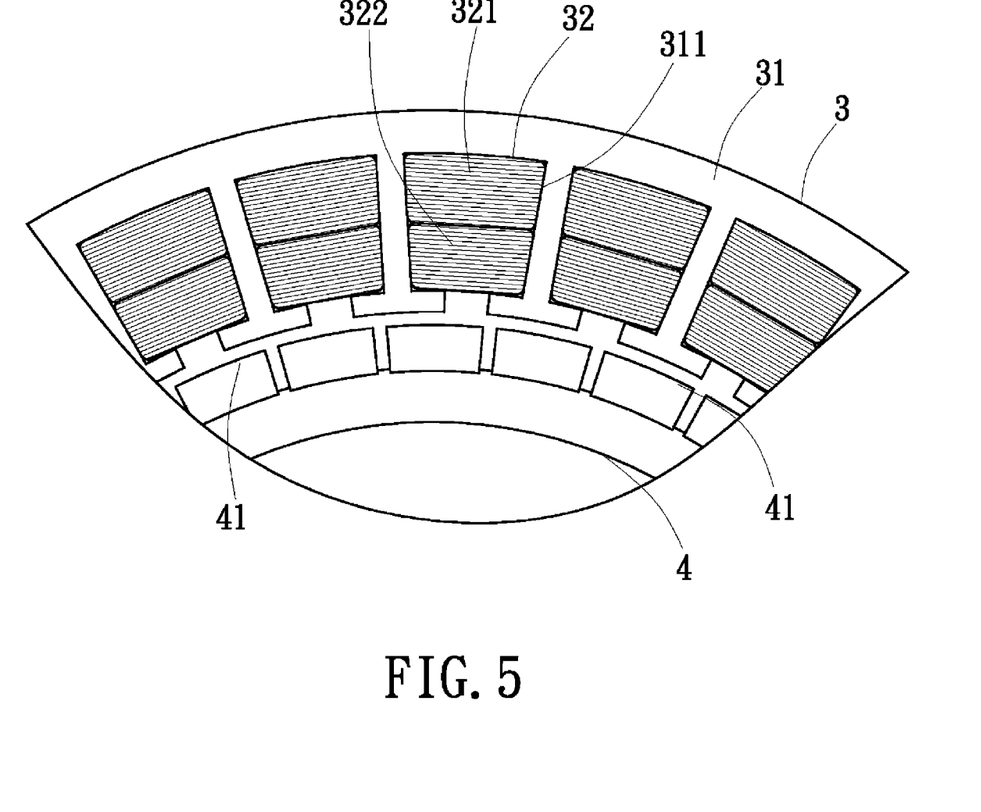
FIG. 5 is a partial sectional view of the stator and the rotor of the compound power mechanism according to the preferred embodiment of the present invention.

As shown in FIG. 2 and FIG. 5, the stator 3 and the rotator 4 are the power source of the motor. The stator 3 is coupled to the inner wall of the main casing 12 of the motor casing 1. Preferably, the stator 3 comprises an annular body 31. An inner wall of the annular body 31 is formed with twenty-seven slots 311. Each slot 311 is provided with a coil unit 32. The coil unit 32 comprises a lower coil unit 321 and an upper coil unit 322. The wire diameter of the copper wires of the coil unit 32 is thicker by about 1 to 2 grades than that of the existing motor copper wires. The rotor 4 is a permanent magnet rotor having thirty-two poles coupled to the motor drive shaft 2. The surface of the rotor 4 is provided with thirty-two permanent magnets 41 corresponding to the coil unit 32. When the coils of the stator 3 are supplied with three-phase current, a turning magnetic field synchronous to the speed of the power frequency will be generated within the stator 3 so as to drive the rotor 4 and the motor drive shaft 2 to rotate.

Figure 3:
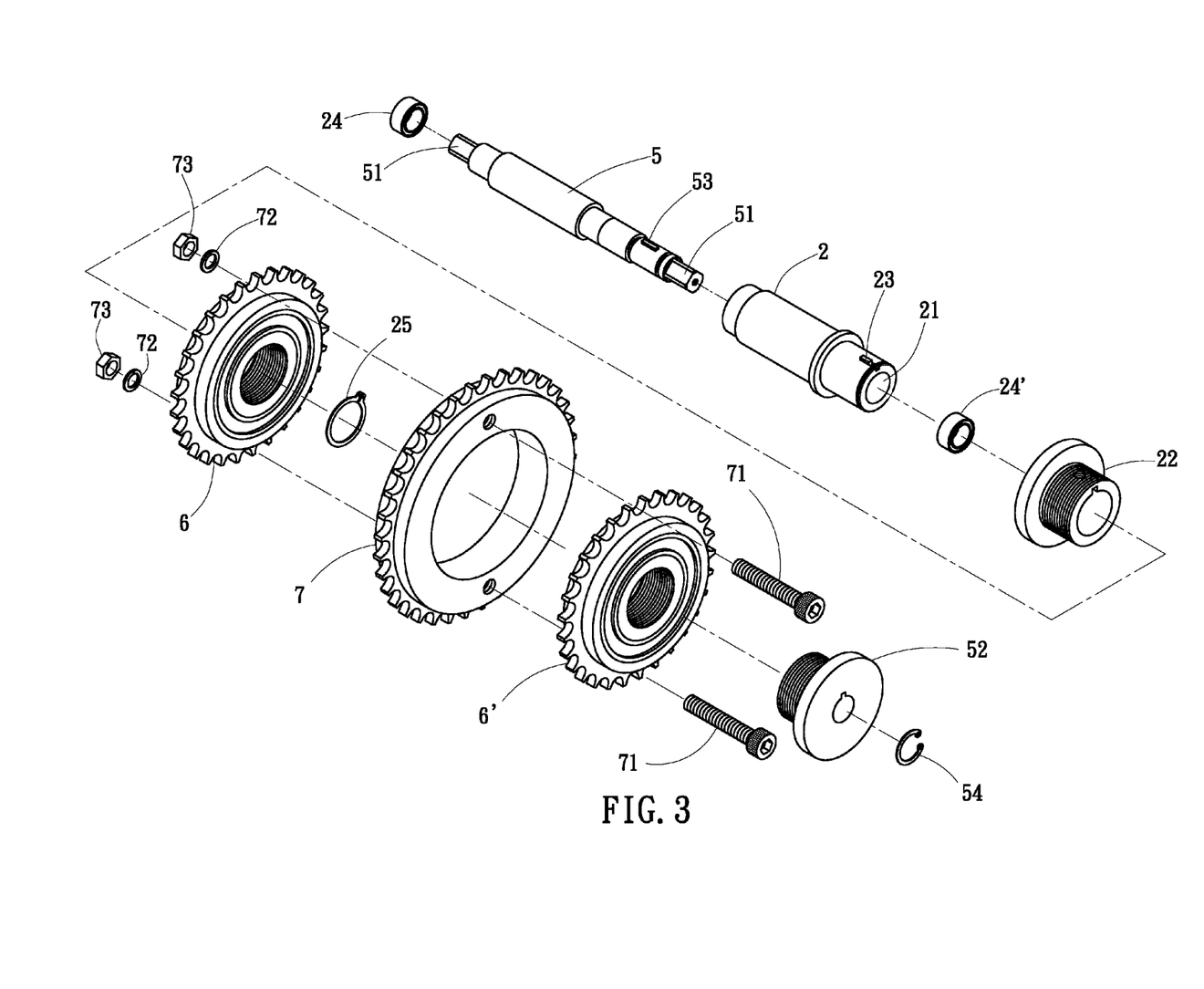
FIG. 3 is a first exploded view of the compound motor mechanism according to the preferred embodiment of the present invention.

As shown in FIG. 2 and FIG. 3, the crank drive shaft 5 provides pedal power to drive the bicycle. The crank drive shaft 5 is rotatably disposed in the inner shaft hole 21 of the motor drive shaft 2. Two ends of the crank drive shaft 5 extend out of the two ends of the motor drive shaft 2 and are provided with crank coupling portions 51, respectively. The crank coupling portions 51 can be quadrilateral posts. Each crank coupling portion 51 is coupled with a pedal crank 8 for the rider to pedal the pedal crank 8 to turn the crank drive shaft 5.

As shown in FIG. 2 and FIG. 3, the freewheel 6 is coupled to one end (extending out of one end of the motor casing 1) of the motor drive shaft 2, such that the freewheel 6 is turned forward by the motor drive shaft 2. When the motor drive shaft 2 is turned rearward, it is idling and won't bring the freewheel 6 to turn rearward. The other freewheel 6' is coupled to one end of the crank drive shaft 5 (at the same side of the motor drive shaft 2 where the freewheel 6 is coupled), such that the freewheel 6' is turned forward by the crank drive shaft 5. Similarly, when the crank drive shaft 5 is turned rearward, it is idling and won't bring the freewheel 6' to turn rearward. The freewheels 6, 6' can be a sprocket wheel having chain teeth. The sprocket wheel is a normal part of the existing bicycle, and it can be a sprocket wheel having eighteen teeth. There is no need to manufacture the sprocket wheel specially.

As shown in FIG. 2 and FIG. 3, the drive sprocket 7 is also an existing normal part of a bicycle, and it can be a drive sprocket having twenty-six to thirty-six teeth. The drive sprocket 7 is fitted between the two freewheels 6, 6'. The drive sprocket 7 is coupled with at least one fixing member 71. The fixing member 71 can be a bolt penetrating the drive sprocket 7 in cooperation with a washer 72 and a nut 73 to be locked on the bolt, enabling the fixing member 71 to engage with the teeth of the freewheels 6, 6' (namely, single speed freewheel). The washer 72 and the nut 73 are adapted to prevent the fixing member 71 from loosening. Thereby, the two freewheels 6, 6' are able to bring the drive sprocket 7 to turn forward, and then the drive sprocket 7 drives the one-section or multi-section derailleurs at the rear wheel of the bicycle through a chain.

Through the forgoing structural design, the compound power mechanism of the present invention is assembled. As shown in FIG. 6 and FIG. 7, the compound power mechanism according to the present invention is installed on a bicycle 10 to constitute an electric bicycle. In an embodiment of the present invention, the motor casing 1 is transversely coupled to a coupling portion 102 of a frame 101 of a bicycle 10. Preferably, the coupling portion 102 is disposed at the junction of the rear lower fork tube and the lower tube and seat pillar post of the frame 101, namely, the installation portion of the big sprocket of the conventional bicycle. The two ends of the crank drive shaft 5 are transversely located at two sides of the bicycle 10. The two ends of the crank drive shaft 5 are coupled with the pedal cranks 8. The drive sprocket 7 is wound with a chain 20. The chain 20 is wound on one-section or multi-section derailleurs (not shown in the drawings) at the rear of the bicycle. The frame 101 of the bicycle 10 (as shown in FIG. 7) or luggage carrier 103 (as shown in FIG. 6) is provided with a lithium battery unit 30 of a 48-volt variable-frequency continuously variable transmission. The lithium battery unit 30 of the variable-frequency continuously variable transmission is electrically connected with the coils of the stator 3. Thereby, an electric bicycle is assembled.

As shown in FIG. 2 and FIG. 3, one end of the motor drive shaft 2 is coupled with a sleeve 22 via a 2×2 flat key 23. One end of the crank drive shaft 5 is coupled with a sleeve 52 via a 3×10 woodruff key 53. The sleeve 22 has a threaded structure coupled with the freewheel 6. The sleeve 52 has a threaded structure coupled with the freewheel 6'. Furthermore, the shaft body of the crank drive shaft 5 is provided with a retaining ring 54. Preferably, the retaining ring 54 is a C-shaped buckle. The retaining ring 54 holds against the end surface of the sleeve 52, providing an axial limitation function for the sleeve 52 and the freewheel 6'. One end of the motor drive shaft 2 is provided with a retaining ring 25. Preferably, the retaining ring 25 is a C-shaped buckle. The retaining ring 25 holds against the end surface of the sleeve 22, providing an axial limitation function for the sleeve 22 and the freewheel 6. In addition, second bearings 24, 24' are provided in the inner axial hole 21 at the two ends of the motor drive shaft 2. The crank drive shaft 5 is disposed in the inner axial hole 21 and located between the two second bearings 24, 24'. Through rolling of the steel balls of the second bearings 24, 24', the friction can be decreased for the crank drive shaft 5 in the motor drive shaft 2.

When the compound power mechanism of the present invention is used, as shown in FIG. 2 and FIG. 6, the stator 3 is supplied with three-phase current to turn the rotor 4 and the motor drive shaft 2. Because of the function of thirty-two poles of the rotor 4 and no conventional reduction gear set, a continuous variable speed of 0-200 rpm can be achieved. The freewheel 6 (single speed freewheel) drives the drive sprocket 7 forward. The rear wheel of the bicycle is driven by the drive sprocket 7 and the chain 20 to turn. Thereby, the electric bicycle goes forward via the motor power. At this time, the freewheel 6' (single speed freewheel) is idling, so the pedal cranks 8 won't turn. There is no need for the user to pedal. If the user rides an uphill path or the power is running out, the pedal cranks 8 can be pedaled to turn the crank drive shaft 5. The crank drive shaft 5 brings the drive sprocket 7 forward through the freewheel 6' (single speed freewheel). The freewheel 6 (single speed freewheel) is idling, so it won't turn the motor drive shaft 2 and the rotor 4. Therefore, the user rides the bicycle in a labor-saving manner.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A compound power mechanism, mounted to a bicycle, the compound power mechanism comprising a motor casing, the motor casing having two shaft holes at two opposing sides thereof; a motor drive shaft disposed between the shaft holes at the two sides of the motor casing, the motor drive shaft having a central inner shaft hole communicating with two ends thereof; a stator coupled in the motor casing and a rotor coupled to the motor drive shaft; a crank drive shaft disposed in the inner shaft hole of the motor drive shaft, two ends of the crank drive shaft extending out of the two ends of the motor drive shaft; a freewheel coupled to one end of the motor drive shaft; another freewheel coupled to one end of the crank drive shaft; and a drive sprocket located between and coupled to the two freewheels, the freewheels respectively bringing the drive sprocket to turn unidirectionally so as to turn a rear wheel of the bicycle.

2. The compound power mechanism as claimed in claim 1, wherein the motor casing comprises a main casing and a side cover; one side of the main casing is provided with one of the shaft holes, another side of the main casing is provided with an opening; the side cover is coupled to the opening of the main casing, the side cover is provided with the other shaft hole; the two shaft holes are respectively provided with two first bearings, and the motor drive shaft is inserted through the two first bearings.

3. The compound power mechanism as claimed in claim 1, wherein the freewheels are single speed freewheels having chain teeth, the drive sprocket is coupled with at least one fixing member, and the fixing member engages with the chain teeth of the single speed freewheels.

4. The compound power mechanism as claimed in claim 3, wherein the motor drive shaft is coupled with a sleeve, the crank drive shaft is coupled with another sleeve, the sleeve of the motor drive shaft is coupled with the freewheel of the motor drive shaft, and the sleeve of the crank drive shaft is coupled with the freewheel of the crank drive shaft.

5. The compound power mechanism as claimed in claim 4, wherein second bearings are provided in the inner axial hole at the two ends of the motor drive shaft, and the crank drive shaft is inserted through the second bearings.

6. The compound power mechanism as claimed in claim 1, wherein the stator comprises an annular body, an inner wall of the annular body is formed with slots, and each of the slots is provided with a coil unit.

7. The compound power mechanism as claimed in claim 6, wherein the coil unit comprises a lower coil unit and an upper coil unit.

8. The compound power mechanism as claimed in claim 6, wherein a surface of the rotor is provided with a plurality of permanent magnets corresponding to the coil units of the slots.

9. The compound power mechanism as claimed in claim 1, wherein the two ends of the crank drive shaft are provided with crank coupling portions, and each of the crank coupling portions is coupled with a pedal crank.

10. An electric bicycle, comprising:
a bicycle frame, a bottom of the bicycle frame being provided with a coupling portion, the coupling portion being disposed at the junction of a rear lower fork tube and a lower tube and seat pillar post of the bicycle frame, the bicycle frame or a luggage carrier being provided with a lithium battery unit of a variable-frequency continuously variable transmission; and
a motor casing fixed to the coupling portion of the bicycle frame, the motor casing having two shaft holes at two opposing sides thereof; a motor drive shaft disposed between the shaft holes at the two sides of the motor casing, the motor drive shaft having a central inner shaft hole communicating with two ends thereof; a stator coupled in the motor casing, the stator being electrically connected with the lithium battery unit of the variable-frequency continuously variable transmission, a rotor coupled to the motor drive shaft; a crank drive shaft disposed in the inner shaft hole of the motor drive shaft, two ends of the crank drive shaft extending out of the two ends of the motor drive shaft; a freewheel coupled to one end of the motor drive shaft; another freewheel coupled to one end of the crank drive shaft; and a drive sprocket located between and coupled to the two freewheels, the drive sprocket being wound with a chain, the chain being wound on a derailleur provided at a rear wheel of the bicycle.

\* \* \* \* \*